(12) United States Patent
Bennett

(10) Patent No.: US 6,772,986 B1
(45) Date of Patent: Aug. 10, 2004

(54) COASTER CLIP

(76) Inventor: Edward D. Bennett, 1401 S. Ocean Blvd., Pompano Beach, FL (US) 33069

( * ) Notice: Subject to any disclaimer, the term of this patent is extended or adjusted under 35 U.S.C. 154(b) by 0 days.

(21) Appl. No.: 10/612,541

(22) Filed: Jul. 2, 2003

(51) Int. Cl.$^7$ ................................................ A47B 5/04
(52) U.S. Cl. ............................ 248/441.1; 248/223.41; 248/456
(58) Field of Search .................. 248/223.41, 224.51, 248/460, 441.1, 456, 544, 309.2, 316.7; 403/295, 401, 403; 446/111, 112, 115; 40/124.19, 124.4, 610; 211/120; 52/71

(56) References Cited

U.S. PATENT DOCUMENTS

| | | | | |
|---|---|---|---|---|
| 2,414,716 A | * | 1/1947 | Carson | 446/112 |
| 2,833,082 A | * | 5/1958 | Carson | 446/95 |
| 3,177,611 A | * | 4/1965 | Beck | 446/114 |
| 3,570,169 A | * | 3/1971 | Jacob | 446/114 |
| 3,827,177 A | * | 8/1974 | Wengel | 446/112 |
| 4,065,220 A | * | 12/1977 | Ruga | 403/169 |
| 4,279,105 A | * | 7/1981 | Cameron | 52/71 |
| 5,570,971 A | * | 11/1996 | Rixen et al. | 403/381 |
| 6,182,580 B1 | * | 2/2001 | Barrett et al. | 108/64 |
| 6,615,523 B1 | * | 9/2003 | Curbelo et al. | 40/606.15 |

* cited by examiner

*Primary Examiner*—Ramon O Ramirez

(57) ABSTRACT

A thin plastic element has a flat central region provided with a plurality of spaced apart radially extending fingers which extend from the region and define the outer edge of the element. These fingers are arranged into first and second finger sets, each set containing a like number of adjacent fingers. Each two adjacent fingers are separated by an intermediate radially extending slot which extends from the central region to the outer edge. Each finger has an enlarged outer end so that the width of each slot is reduced at these enlarged ends and is otherwise itself enlarged. The outer ends of the first set of adjacent fingers are disposed at discrete positions along a circular arc. The outer ends of the second set of adjacent fingers are disposed at discrete positions along a straight line.

3 Claims, 2 Drawing Sheets

COASTER CLIP

BACKGROUND OF THE INVENTION

Children enjoy erecting and collapsing temporary structures of playing cards on a suitable horizontal supporting surface. These structures are unstable and, occasionally, can collapse while a child wants the structure to remain upright.

The present invention is directed toward new and inexpensive arrangements for preventing such collapse. These arrangements employ a plurality of flat thin card-like members and a plurality of inexpensive devices which detachably receive such members and support same in position upon a suitable horizontal supporting surface.

SUMMARY OF THE INVENTION

In accordance with the principles of this invention, each device takes the form of a thin plastic element having a flat central region provided with a plurality of spaced apart radially extending fingers that extend from the region and define the outer edge of the element. These fingers are arranged into first and second finger sets, each set containing a like number of fingers.

Each two adjacent fingers are separated by an intermediate radially extending slot extending from the central region to the outer edge.

Each finger has an enlarged outer end so that the width of each slot is reduced at these enlarged ends and is otherwise itself enlarged. The outer ends of the first set of adjacent fingers are disposed at discrete positions along a circular arc. The outer ends of the second set of adjacent fingers are disposed at discrete positions along a straight line.

The first and last fingers in the second group have outer edges which can define parallel lines which are perpendicular to the straight line.

Illustratively, there are four fingers in each set.

In use, a plurality of these devices can be disposed in spaced apart positions with the outer ends of some elements in the second group resting upon a suitable support surface. Structures can be erected by inserting thin card like members in the various slots, connecting them as desired. Other devices can be supported by connected cards and disposed above the support surface.

The thickness of the members is smaller than the enlarged slot widths and is somewhat larger than the reduced thickness of the slot widths so that the members are held firmly in position but can be removed with slight force as desired.

DETAILED DESCRIPTION OF PREFERRED EMBODIMENT

Figure 1:
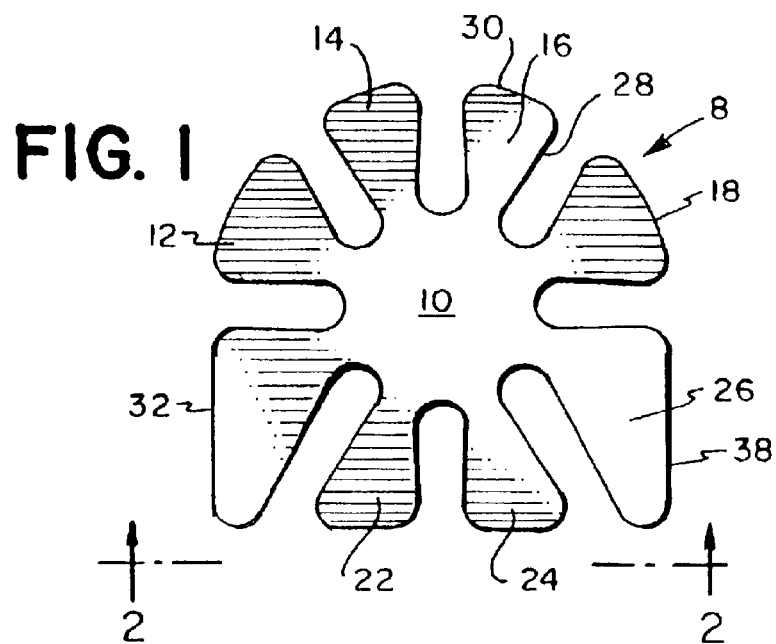
FIG. 1 is a plan view of a preferred embodiment of a device in accord with the invention.
Figure 2:
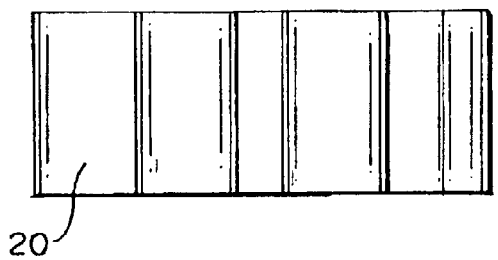
FIG. 2 is a side view of the device taken along line 2—2 in FIG. 1.

Referring first to FIGS. 1 and 2, a thin flat plastic element identified generally at 8 has a flat central region 10 provided with eight spaced apart radially extending fingers 12, 14, 16, 18, 20, 22, 24 and 26 which extend from the region and define the outer edge of the element. These fingers are arranged into a first set of fingers 12, 14, 16, and 18 and a second set of fingers 20, 22, 24 and 26.

Each two adjacent fingers are separated by an intermediate radially extending slot 28 that extends from the central region to the outer edge. Each finger has an enlarged outer end 30 so that the width of each slot is reduced at these enlarged ends and is otherwise itself enlarged. The outer ends of the first set of four adjacent fingers are disposed at discrete positions along a circular arc. The outer ends of the second set of four adjacent fingers are disposed at discrete positions along a straight line.

The first and last fingers in the second group have outer edges 32 which can define parallel lines which are perpendicular to the straight line.

Figure 4:
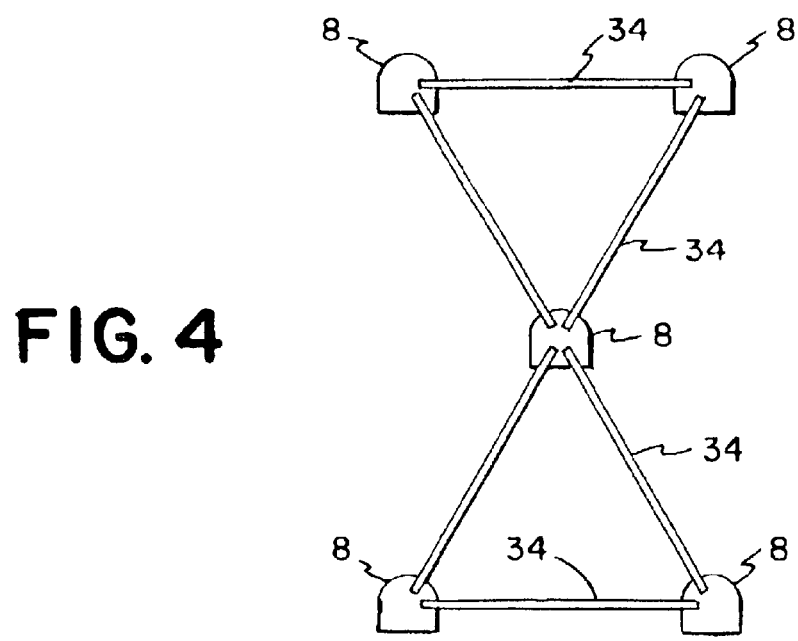
FIG. 4 is a side view of the structure shown in FIG. 3.
Figure 3:
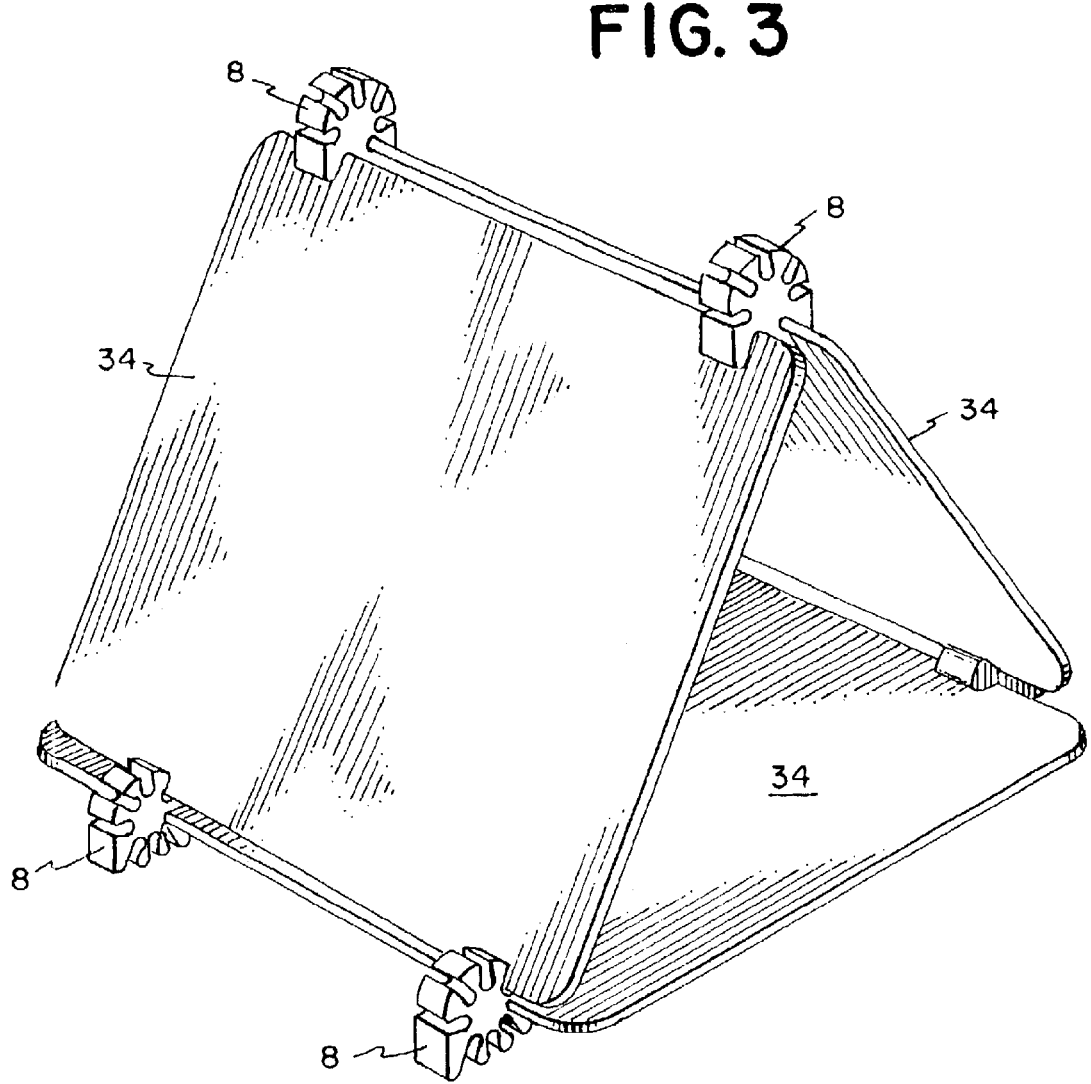
FIG. 3 is a perspective view showing the invention in use.

As shown in FIGS. 3 and 4, a plurality of thin card-like members 34 can cooperate with a plurality of elements 8 to form structures as previously explained. The thickness of each card is slightly larger than the reduced minimum of the slots and is somewhat smaller than the enlarged slot widths. Thus any portion of a card can be inserted and held by friction in a slot in an element, but a user can easily overcome the friction and remove the card as desired.

Some of the elements must have their straight line ends engaging a supporting surface, while others can be elevated as shown. Any structure can be assembled or taken apart by hand as desired.

While the invention has been described with particular reference to preferred embodiments, the protection sought is to be limited only by the terms of the claims which follow.

What is claimed is:

1. A device comprising:
    a thin plastic element having a flat central region provided with a plurality of spaced apart radially extending fingers which extend from the region and define the outer edge of the element:
    said fingers being arranged into first and second finger sets, each set containing a like number of adjacent fingers;
    each two adjacent fingers being separated by an intermediate radially extending slot which extends from the central region to the outer edge;
    each finger having an enlarged outer end so that the width of each slot is reduced at these enlarged ends and is otherwise itself enlarged;
    the outer ends of the first set of adjacent fingers being disposed at discrete positions along a circular arc;
    the outer ends of the second set of adjacent fingers being disposed at discrete positions along a straight line;
    the first and last fingers in the second group have outer edges which can define parallel lines which are perpendicular to the straight line.

2. The device of claim 1 wherein there are four fingers in each group.

3. The device of claim 2 wherein the outer edges of the first and last fingers in the second group define straight lines perpendicular to said straight line.

* * * * *